2,708,153

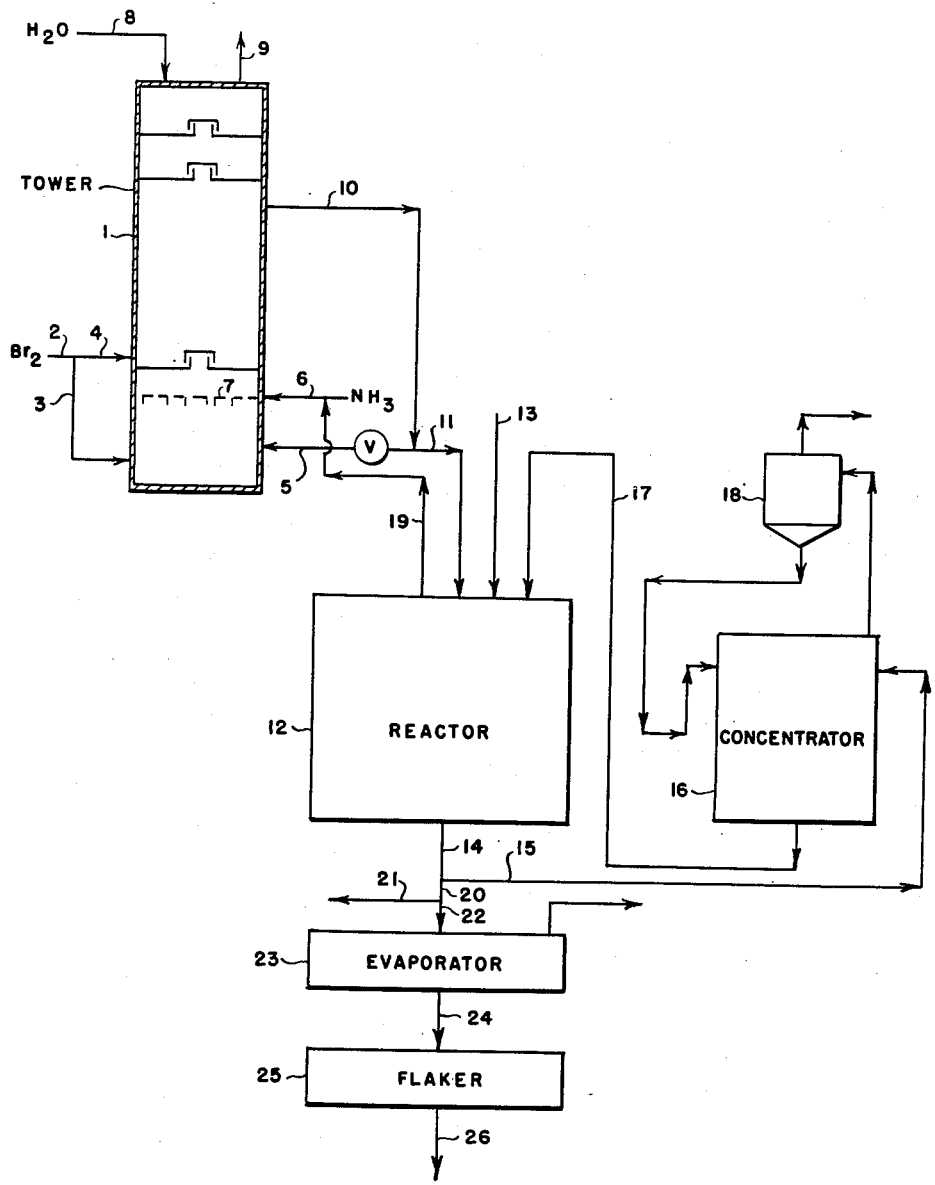
May 10, 1955     J. N. FELGER     2,708,153
THE MANUFACTURE OF HYDRAZINE HYDROBROMIDE
Filed Dec. 30, 1953
James N. Felger
*INVENTOR.*
BY
*Adams, Forward and McLean*
ATTORNEYS

MANUFACTURE OF HYDRAZINE HYDROBROMIDE

James N. Felger, Kenmore, N. Y., assignor to Olin Mathieson Chemical Corporation, a corporation of Virginia Application December 30, 1953, Serial No. 401,246

8 Claims. (Cl. 23—190)

My invention relates to the manufacture of hydrazine hydrobromide. More particularly, my invention relates to a novel two-stage unitary process which may be cyclic and continuous for the manufacture of hydrazine hydrobromide from hydrazine, bromine and ammonia. Hydrazine hydrobromide is a material useful, for example, in soldering fluxes for aluminum metals.

I have found that hydrazine hydrobromide is produced in good yields and in aqueous solution or anhydrous form by producing an aqueous solution of ammonium bromide from bromine, ammonia and water in a tower type contact system and reacting the ammonium bromide solution with hydrazine to form hydrazine hydrobromide and ammonia which is returned to the ammonium bromide producing step. According to the process of my invention, I absorb and react bromine and ammonia in an aqueous solution of ammonium bromide in a tower type contact system. An aqueous solution of ammonium bromide is removed from the tower system and reacted with hydrazine in a reaction zone. Hydrazine hydrobromide is recovered in aqueous solution and advantageously can be readily concentrated and evaporated to obtain the anhydrous salt. Ammonia is recovered and returned to the absorbing and reacting step in the tower system. Thus, my invention provides an economic and effective cyclic and continuous process in which good yields of hydrazine hydrobromide in aqueous solution or anhydrous form are obtained and in which by-product ammonia is effectively utilized.

In the ammonium bromide producing stage, the absorption and reaction are carried out in a tower type contact system. The absorption and reaction may be carried out in one tower or in separate towers connected in series. Towers, or sections of a single tower, are provided for absorbing bromine and ammonia in an aqueous solution of ammonium bromide, for the reaction of the bromine and ammonia in the ammonium bromide medium and for the scrubbing of residual bromine and ammonia from the by-product gases from the reaction. For example, a satisfactory segmented tower is one separated into four sections by means of bubble cap trays defining a bottom section for bromine and ammonia absorption, a center section comprising a major proportion of the tower for ammonia and bromine reaction and two small absorber top sections for water scrubbing. The following description of my invention relates to such a segmented tower but it will be understood that separate towers may also be used.

In the absorption, bromine, ammonia and aqueous ammonium bromide are charged to the bottom section of a segmented tower. Liquid bromine is introduced suitably into the bottom section of the tower and aqueous ammonium bromide solution is also introduced by recycle from the reactor section which disperses and partially dissolves the bromine in this section. Advantageously, the tray separating the bottom absorption section from the center reactor section also carries a layer of liquid bromine. Ammonia is introduced by suitable means into the bottom section, for example, through a sparger tube just below the tray.

In the reactor section surmounting the bottom section of the segmented tower and comprising a major proportion of the tower, dissolved bromine and ammonia in the ammonium bromide solution react to form additional salt and by-product nitrogen according to the following equation:

$$8NH_3 + 3Br_2 \rightarrow N_2 + 6NH_4Br$$

In the segmented tower, the top of the reactor section of the tower is defined by a bubble cap tray separating the reactor from the top absorber sections. Aqueous ammonium bromide solution is removed from the reactor section just below the tray. Two small absorber sections separated by a bubble cap tray occupy the top portion of the tower. Water is introduced into the topmost section of the tower to scrub residual ammonia and bromine from the by-product nitrogen gas. Waste nitrogen is vented from the top.

Ammonium bromide solution is recycled to the bottom section of the tower to serve as a medium for the reaction and to produce an effluent solution from the reactor section of the tower of the desired concentration. The usual concentration is about 40 per cent or more.

The temperature of the various sections of the ammonium bromide synthesis tower varies in the different sections. The bromine-dissolving and reaction sections of the tower are suitably maintained between about 60 and 70° C. by cooling the recycle ammonium bromide liquor. The introduction of water into the absorber section at the top of the tower usually maintains the liquor temperature in this section below about 35° C. The introduction of ammonia into the tower system in the liquid state aids in controlling the temperature of the contents of the tower. Aqueous ammonia, for example, 28 per cent ammonia, and cooled, if desired, may be used. Heat is added to or removed from the tower system by suitable internal, external or integral heat exchangers or heat exchange sections. The tower system is ordinarily operated at substantially atmospheric pressure. The reaction section is maintained in a substantially flooded condition except for the nitrogen gas evolved by the reaction.

In the reactor for the production of hydrazine hydrobromide, agitation is provided while charging hydrazine and aqueous ammonium bromide from the reactor section of the ammonium bromide synthesis tower or an interposed surge tank. A slight excess of ammonium bromide is preferred. The hydrazine may be introduced as anhydrous hydrazine, 95 per cent hydrazine, hydrazine hydrate or more dilute solutions of hydrazine. The use of hydrazine hydrate is particularly advantageous, however, since more concentrated hydrazine is relatively expensive. Removing excessive amounts of water when more dilute hydrazine is introduced adds to the cost of the operation and is less desirable.

The contents of the reactor can be concentrated batchwise or continuously removed and circulated through a heater and a vacuum concentrator and back to the reactor in order to maintain the concentration of the solution in the reactor at a suitable value. Ammonia evolved from the reactor is recycled to the ammonium bromide synthesis tower system. The ammonium bromide and hydrazine react to form ammonia and hydrazine hydrobromide according to the following equation:

$$NH_4Br + N_2H_4 \rightarrow N_2H_5Br + NH_3$$

A concentrated solution of hydrazine hydrobromide, suitably about 70 per cent, is removed from the reactor and may be used as such where aqueous hydrazine hydrobromide is desired as the product. To produce anhydrous hydrazine hydrobromide as a product, the concentrated aqueous solution is charged to a vacuum evaporator and reduced to substantially water-free, fused hydrazine hydrobromide. The latter is then charged to a flaker and obtained as solid anhydrous hydrazine hydrobromide.

The process of my invention will be further illustrated by reference to the accompanying drawing which illustrates one embodiment of my invention.

In the drawing, a segmented tower 1 is used for the absorption and reaction. The tower is divided into four sections separated by bubble cap trays defining a bottom bromine and ammonia absorption section, a center reaction section and two small absorber top sections for water scrubbing. Liquid bromine is introduced into the bottom section of the tower 1 by lines 2 and 3 and onto the bubble cap tray separating the bottom absorption section from the reactor section by line 4. Aqueous ammonium bromide solution is recycled to the bottom absorption section of the tower 1 by line 5. Ammonia is introduced into the bottom absorption section by line 6 through a sparger tube 7. The ammonium bromide solution containing bromine and ammonia passes to the reactor section of the tower 1 where ammonium bromide and nitrogen are formed. Water is introduced by line 8 into the top absorber section to scrub the residual ammonia and bromine from the by-product nitrogen gas, which is vented by line 9. Aqueous ammonium bromide solution is removed by line 10 from the reactor section.

The aqueous ammonium bromide solution is charged by line 11 to reactor 12. Hydrazine, preferably hydrazine hydrate, is introduced into the reactor by line 13. The contents of the reactor are concentrated by continuously removing the contents through lines 14 and 15 to a vacuum concentrator 16 and then returning the concentrated solution by line 17 to reactor 12. Vacuum is supplied to the concentrator through separator 18. Ammonia evolved from the reactor 12 is returned to the tower 1 by line 19. A concentrated aqueous solution of hydrazine hydrobromide, for example, about 70 per cent concentration, is removed from the reactor by lines 14 and 20. When the aqueous solution of hydrazine hydrobromide is the product desired, it is removed through line 21. When anhydrous hydrazine hydrobromide is desired, the aqueous solution is charged through line 22 to vacuum evaporator 23 and reduced to substantially water-free fused hydrazine hydrobromide, which is then charged by line 24 to flaker 25 and removed by line 26 as solid anhydrous hydrazine hydrobromide.

A specific operating example would provide that 4,600 lbs. per hour of water, 2,492 lbs. per hour of bromine and 176 lbs. per hour of makeup ammonia, in addition to 532 lbs. per hour of recycle ammonia, be added to the ammonium bromide reactor. The temperature within the ammonium bromide reaction zone is normally held at 60–70° C. by the use of an external heat exchanger. On this basis, 7,660 lbs. per hour of ammonium bromide solution are charged to a separate reactor in addition to 1,560 lbs. per hour of hydrazine hydrate to produce 3,520 lbs. per hour of hydrazine hydrobromide. During this reaction the temperature is held below 50° C. to minimize the loss of ammonia. Subsequently, the ammonia is distilled off for recycle to the ammonium bromide reactor at which time the temperature is deliberately allowed to rise above 100° C. to separate free ammonia from the salt solution. This operation is carried out under a pressure of 3–5 p. s. i. g. to allow the ammonia to distill into the ammonium bromide reactor. After the ammonia has been separated, the hydrazine hydrobromide is dehydrated at a negative pressure in excess of 26 inches of vacuum at which time a temperature of 120° C. is maintained to insure complete dehydration.

I claim:

1. A two-stage cyclic process for the manufacture of hydrazine hydrobromide which comprises absorbing and reacting bromine and ammonia in an aqueous solution of ammonium bromide in a tower type contact system to form ammonium bromide, removing an aqueous ammonium bromide solution from the tower type contact system to a reaction zone, reacting the aqueous ammonium bromide solution with hydrazine in the reaction zone to form hydrazine hydrobromide and ammonia, recovering hydrazine hydrobromide and ammonia and returning ammonia to the absorbing and reacting step.

2. The process of claim 1 in which the hydrazine is hydrazine hydrate.

3. A two-stage cyclic process for the manufacture of hydrazine hydrobromide which comprises absorbing and reacting bromine and ammonia in an aqueous solution of an ammonium bromide in a tower type contact system to form ammonium bromide, removing an aqueous ammonium bromide solution from the tower type contact system to a reaction zone, reacting the aqueous ammonium bromide solution with hydrazine in the reaction zone to form hydrazine hydrobromide and ammonia, recovering and returning ammonia to the absorbing and reacting step, recovering an aqueous solution of hydrazine hydrobromide and concentrating and heating the aqueous solution of hydrazine hydrobromide to obtain substantially water-free solid hydrazine hydrobromide.

4. The process of claim 3 in which the hydrazine is hydrazine hydrate.

5. A two-stage cyclic process for the manufacture of hydrazine hydrobromide which comprises absorbing bromine and ammonia in an aqueous solution of ammonium bromide in a tower type contact system, adding more bromine to the resulting solution in the tower system, withdrawing an aqueous ammonium bromide solution from the tower system, returning a portion of the ammonium bromide solution to the absorbing step and introducing a portion of the ammonium bromide solution to a reaction zone, reacting the aqueous ammonium bromide solution with hydrazine in the reaction zone to form hydrazine hydrobromide and ammonia, recovering hydrazine hydrobromide and ammonia and returning ammonia to the absorbing and reacting step.

6. The process of claim 5 in which the hydrazine is hydrazine hydrate.

7. A two-stage cyclic process for the manufacture of hydrazine hydrobromide which comprises absorbing bromine and ammonia in an aqueous solution of ammonium bromide in a tower type contact system, adding more bromine to the resulting solution in the tower system, withdrawing an aqueous ammonium bromide solution from the tower system, returning a portion of the ammonium bromide solution to the absorbing step and introducing a portion of the ammonium bromide solution to a reaction zone, reacting the aqueous ammonium bromide solution with hydrazine in the reaction zone to form hydrazine hydrobromide and ammonia, recovering and returning ammonia to the absorbing and reacting step, recovering an aqueous solution of hydrazine hydrobromide and concentrating and heating the aqueous solution of hydrazine hydrobromide to obtain substantially water-free solid hydrazine hydrobromide.

8. The process of claim 7 in which the hydrazine is hydrazine hydrate.

No references cited.